Oct. 14, 1941.    H. L. LOCKRIDGE    2,259,170
AGRICULTURAL IMPLEMENT
Filed Jan. 20, 1940    3 Sheets-Sheet 1
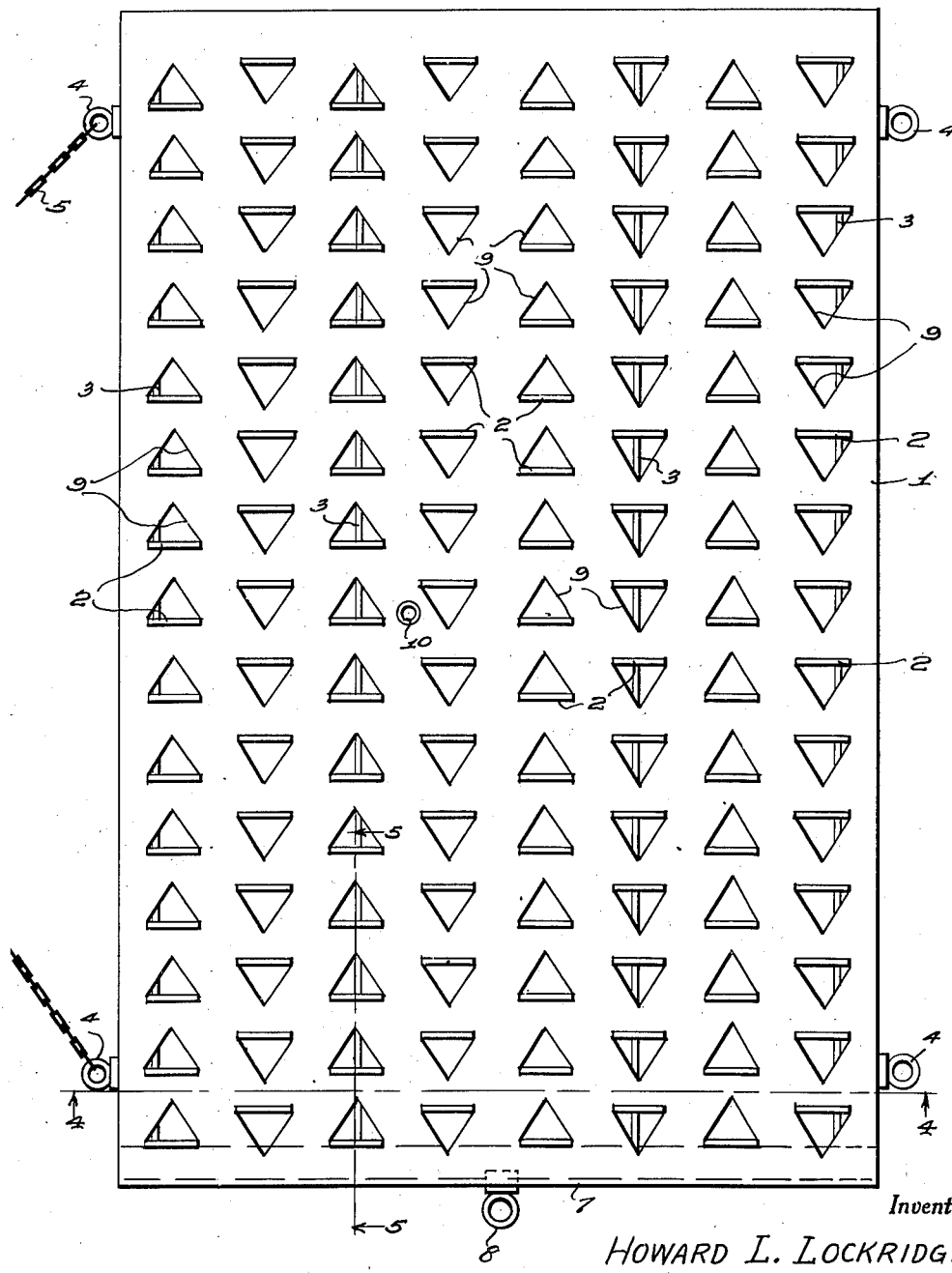
Inventor
HOWARD L. LOCKRIDGE
By Clarence A. O'Brien
and Hyman Berman
Attorneys

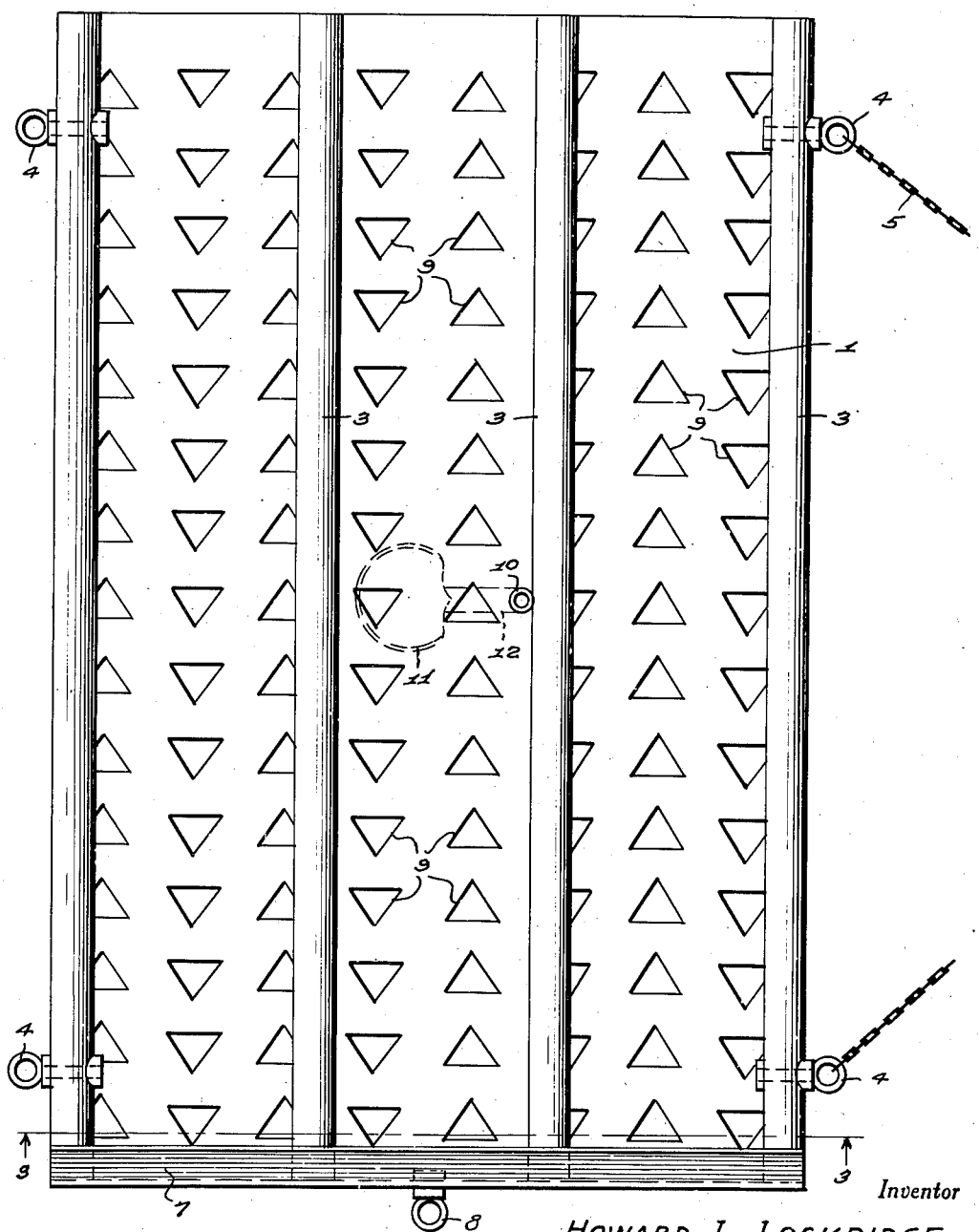

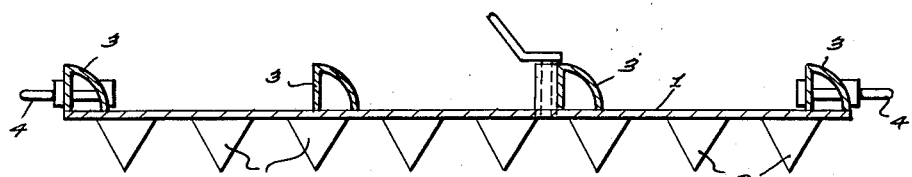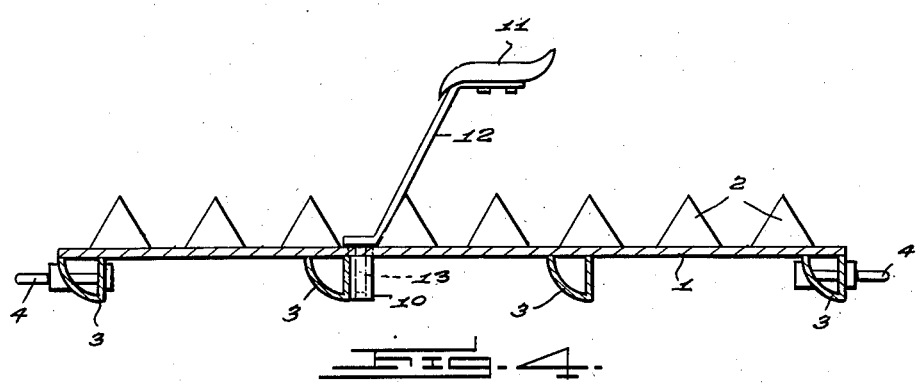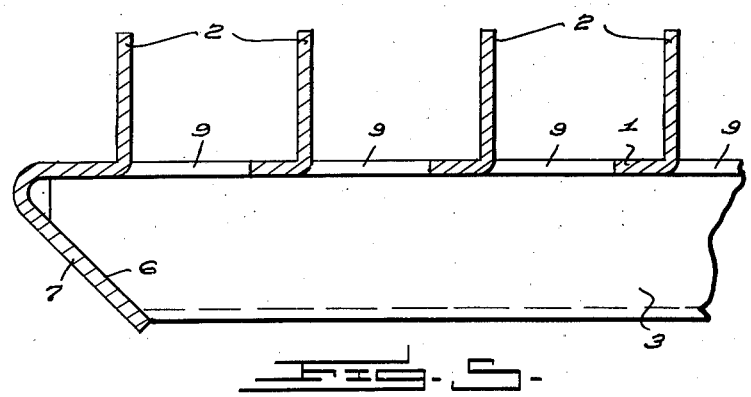

Patented Oct. 14, 1941

2,259,170

UNITED STATES PATENT OFFICE 2,259,170

AGRICULTURAL IMPLEMENT

Howard L. Lockridge, Augusta Springs, Va.

Application January 20, 1940, Serial No. 314,870

2 Claims. (Cl. 55—23)

The present invention relates generally to new and useful improvements in agricultural implements and has for its primary object to provide, in a manner as hereinafter set forth, a device of this character embodying a novel construction, combination and arrangement of parts whereby said device may be used either as a harrow, drag or pulverizer.

Another very important object of the invention is to provide a combination implement of the aforementioned character which, when not performing one of its functions, may be conveniently drawn over the ground to and from the field, for example.

Still another important object of the invention is to provide a combination implement of the character described comprising a novel all metal construction.

A still further important object of the invention is to provide a combination agricultural implement comprising a removable operator's seat which is adapted to be conveniently mounted for use on either side of the device.

Other objects of the invention are to provide a combination harrow and drag which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figures 1 and 2 are plan views of an agricultural implement constructed in accordance with the present invention.

Figure 3 is a view in vertical section, taken substantially on the line 3—3 of Fig. 2, showing the implement being used as a harrow.

Figure 4 is a vertical sectional view, taken substantially on the line 4—4 of Fig. 1, showing the implement being used as a drag.

Figure 5 is a fragmentary view in cross section, taken substantially on the line 5—5 of Fig. 1.

Referring now to the drawings in detail, it will be seen that the embodiment of the invention which has been illustrated comprises a substantially rectangular metallic plate 1 which may be of any suitable dimensions. Struck from the plate 1 are transversely extending rows of substantially triangular teeth 2. As illustrated to advantage in Fig. 1 of the drawings, the alternate rows of the teeth 2 are struck in opposite directions from the plate 1, thus staggering said teeth. Mounted transversely on the other side of the plate 1 are spaced, parallel bars 3 of substantially one quarter segmental cross section, said bars being of suitable metal. The bars 3 may be fixed to the plate 1 by soldering, welding or any other suitable method. Mounted in the end portions of the outermost bars 3 are pairs of eye bolts 4 to either pair of which a draft chain 5 may be connected.

Referring now to the Fig. 5 of the drawings, it will be observed that one end of the bars 3 is bevelled, as at 6. The corresponding end portion of the plate 1 projects beyond the bars 3 and is bent downwardly and inwardly in a manner to provide an inclined flange or apron 7. The inclined flange 7 is fixed to the bevelled ends 6 of the bars 3, as by welding, and closes said bars at this end. Mounted on the flange 7 at an intermediate point is an eye bolt 8 for connecting a draft chain to this end of the implement.

Rigidly secured, as by welding, at an intermediate point on one of the inner bars 3 is a vertical tube 10 of suitable metal, one end portion of which extends through an opening provided therefor in the plate 1. The reference numeral 11 designates an operator's seat which, as shown in Figs. 3 and 4 of the drawings, is adapted to be removably mounted on either side of the plate 1. Toward this end, the seat 11 comprises a support 12 having rigidly secured on its lower end portion a shank or stem 13 which is engageable in the tube 10. Of course, the tube 10 is open at both ends for the reception of the shank 13.

It is thought that the manner in which the implement is used will be readily apparent from a consideration of the foregoing. For harrowing, the implement is drawn over the ground with the teeth 2 lowermost. The construction and arrangement of the teeth 2 is such that the ground will be thoroughly harrowed after the implement passes but once thereover. When the device is to be used as a drag and pulverizer it is simply turned over in a manner to travel on the substantially segmental metallic bars 3. Of course, the implement may be suitably weighted if desired. In addition to levelling the soil and breaking up clods, the substantially segmental metallic bars 3 greatly strengthen or reinforce the plate 1. When the implement is to be moved to or from the field or over the highway the draft is connected to the eye bolt 8. When this is done the bars 3 function as runners or shoes. The inclined flange 7 greatly assists the implement in riding over obstructions that may be encountered when said implement is being pulled in this manner. Also, the implement may be pulled in either direction when being used as a harrow or drag by connecting the draft chain 5 to the eye bolts 4 on either of the outermost bars 3. It will therefore be seen that, should the teeth 2 become worn or damaged on one side after long use, the implement may be simply reversed. The reference numeral 9 designates substantially triangular openings which are left in the plate 1 when the teeth 2 are struck therefrom.

It is believed that the many advantages of an agricultural implement constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. An agricultural implement comprising a plate, a plurality of spaced, parallel bars of substantially segmental section fixed transversely on one side of said plate, one end of said bars being bevelled, the corresponding end portion of the plate extending beyond this end of the bars and terminating in a downwardly and inwardly turned flange fixed to the bevelled ends of the bars.

2. An agricultural implement comprising a metallic plate, teeth struck from one side of said plate, a plurality of spaced, parallel bars mounted on the other side of the plate, a vertical tube mounted on one of the bars and extending through the plate, and a removable operator's seat adapted to be mounted on either side of the plate, said seat comprising a support, and a shank on one end portion of said support insertable in the tube from either end thereof for mounting the seat thereon.

HOWARD L. LOCKRIDGE.